US010882753B2

(12) United States Patent
Lefevre

(10) Patent No.: US 10,882,753 B2
(45) Date of Patent: Jan. 5, 2021

(54) METHOD FOR EXCHANGING INTERLAYER ANIONS OF A LAYERED DOUBLE HYDROXIDE

(71) Applicants: Paris Sciences Et Lettres—Quartier Latin, Paris (FR); Centre National de la Recherche Scientifique (CNRS), Paris (FR)

(72) Inventor: Grégory Lefevre, Paris (FR)

(73) Assignees: Paris Sciences Et Lettres—Quartier Latin; Centre National de la Recherche Scientifique (CNRS)

( * ) Notice: Subject to any disclaimer, the term of this patent is extended or adjusted under 35 U.S.C. 154(b) by 160 days.

(21) Appl. No.: 16/333,493

(22) PCT Filed: Sep. 15, 2017

(86) PCT No.: PCT/EP2017/073227
§ 371 (c)(1),
(2) Date: Mar. 14, 2019

(87) PCT Pub. No.: WO2018/050799
PCT Pub. Date: Mar. 22, 2018

(65) Prior Publication Data
US 2019/0263671 A1     Aug. 29, 2019

(30) Foreign Application Priority Data
Sep. 15, 2016   (EP) .................................... 16306178

(51) Int. Cl.
*C02F 1/42* (2006.01)
*B01J 41/02* (2006.01)
(Continued)

(52) U.S. Cl.
CPC .............. *C01F 7/005* (2013.01); *B01J 20/041* (2013.01); *B01J 41/02* (2013.01); *B01J 49/57* (2017.01);
(Continued)

(58) Field of Classification Search
None
See application file for complete search history.

(56) References Cited

U.S. PATENT DOCUMENTS

| 2011/0006010 A1* | 1/2011 | Asakura .................. B01J 41/10 |
| | | 210/670 |
| 2013/0260990 A1 | 10/2013 | Kwon et al. |
| 2015/0258212 A1 | 9/2015 | Thompson et al. |

FOREIGN PATENT DOCUMENTS

CN           102337411 A      2/2012

OTHER PUBLICATIONS

Bellezza et al., Intercalation of 5-fluorouracil into ZnAl hydrotalcite-like nanoparticles: Preparation, characterization and drug release, Applied Clay Science, Sep. 2014, vol. 101, pp. 320-326.
(Continued)

*Primary Examiner* — Matthew O Savage
(74) *Attorney, Agent, or Firm* — Lerner, David, Littenberg, Krumholz & Mentlik, LLP

(57) ABSTRACT

The invention relates to a method for exchanging interlayer anions of a layered double hydroxide (LDH) with other anions whose affinity for the LDH is lower than the one of the starting interlayer anions, which comprises the successive steps of: (1) exchanging the starting interlayer anions of a layered double hydroxide with polyoxometalate anions in order to obtain a layered double hydroxide with polyoxometalate anions as interlayer anions, and (2) exchanging the polyoxometalate anions of the layered double hydroxide obtained in step (1) with other anions whose affinity for the LDH is lower than the one of the starting interlayer anions (Continued)

in order to obtain a layered double hydroxide with other anions as interlayer anions.

20 Claims, 8 Drawing Sheets

(51) Int. Cl.
*C01F 7/00* (2006.01)
*B01J 20/04* (2006.01)
*B01J 49/57* (2017.01)

(52) U.S. Cl.
CPC ............ *C02F 1/42* (2013.01); *C01P 2002/08* (2013.01); *C01P 2002/22* (2013.01); *C01P 2002/82* (2013.01); *C02F 2001/422* (2013.01); *C02F 2303/16* (2013.01)

(56) References Cited

OTHER PUBLICATIONS

Ciocan et al., New approach for synthesis of Mo-containing LDH based catalysts, Catalysis Today, Jun. 2012, vol. 198, pp. 239-245.
Costantino et al., New Synthetic Routes to Hydrotalcite-Like Compounds—Characterisation and Properties of the Obtained Materials, European Journal of Inorganic Chemistry, Mar. 1998, pp. 1439-1446.
Cruywagen et al., Tungsten(VI) Equilibria: A Potentiometric and Calorimetric Investigation, Journal of Chemical Society, Dalton Trans., Jan. 1987, No. 7, pp. 1701-1705.
Cruywagen, Protonation, Oligomerization, and Condensation Reactions of Vanadate(V), Molybdate(VI), and Tungstate(VI), Advances in Inorganic Chemistry, Oct. 1999, vol. 49, pp. 127-182.
Frantisek Kovanda et al., Removal of Anions from Solution by Calcined Hydrotalcite and Regeneration of Used Sorbent in Repeated Calcination-Rehydration-Anion Exchange Processes, Collection Symposium Series, Symposium on Chemistry of Nucleic Acid Components Spindleruv Mlyn, Czech Republic, Sep. 3, 2005 to Sep. 9, 2005, vol. 64, No. 9, pp. 1517-1528.
Goh et al., Application of Layered Double Hydroxides for Remival of Oxyanions, A Review, Water Research, Elsevier, Amsterdam, NL, vol. 42, No. 6-7, Nov. 7, 2007, pp. 1343-1368.
International Search Report from PCT/EP2017/073227 dated Jan. 9, 2018, 3 pages.
Kai Yan et al., Recent Advances in the Synthesis of Layered Double-Hyroxide-Based Materials and Their Applications in Hydrogen and Oxygen Evolution, Energy Technology, vol. 4, No. 3, Feb. 10, 2016, pp. 354-368.
Kovanda et al., Intercalation of paracetamol into the hydrotalcite-like host, Journal of Solid State Chemistry, Oct. 2011, vol. 184, pp. 3329-3335.
L. H. Mendoza-Huizar, Global and Local Reactivity Descriptors for Picloram Herbicide: A Theoretical Quantum Study , Quim. Nova, Oct. 2014, vol. 38, No. 1, pp. 71-76.
Lefèvre et al., Infrared Study of (Poly)tungstate Ions in Solution and Sorbed into Layered Double Hydroxides: Vibrational Calculations and In Situ Analysis, Journal of Physical Chemistry C, May 2015, vol. 119, pp. 12356-12364.
Lyi et al., Deintercalation of carbonate ions from carbonate-type layered double hydroxides (LDHs) using acid-alcohol mixed solutions, Applied Clay Science, Sep. 2011, vol. 54, pp. 132-137.
Parello et al., Dissolution kinetics and mechanism of Mg-Al layered double hydroxides: A simple approach to describe drug release in acid media, Journal of Colloid and Interface Science, Jul. 2010, vol. 351, pp. 134-139.
Prasanna et al., Anion-Exchange Reactions of Layered Double Hydroxides: Interplay between Coulombic and H-Bonding Interactions, Journal of Ind. Eng. Chem. Res., May 2009, vol. 48, pp. 6315-6320.
Thangaraj et al., Silicate intercalated cobalt chromium-hydrotalcite (CoCr—HTSi): An environment-friendly recyclable catalyst for organic transformations, Catalysis Communications, Nov. 2015, vol. 74, pp. 85-90.

\* cited by examiner

METHOD FOR EXCHANGING INTERLAYER ANIONS OF A LAYERED DOUBLE HYDROXIDE

CROSS-REFERENCE TO RELATED APPLICATIONS

The present application is a national phase entry under 35 U.S.C. § 371 of International Application No. PCT/EP2017/073227, filed Sep. 15, 2017, which claims priority from European Patent Application No. 16306178.1, filed Sep. 15, 2016, all of which are incorporated herein by reference.

FIELD OF THE INVENTION

The present invention relates to a method for exchanging interlayer anions of a layered double hydroxide (LDH), this method being useful notably to prepare new LDHs or to extract anions from a liquid medium.

BACKGROUND OF THE INVENTION

Layered double hydroxides (LDHs) are inorganic materials that consist of positively charged stacked layers with charge-balancing anions located in the interlayer regions (FIG. 1a). They can be represented by the general formula

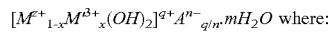
$[M^{z+}{}_{1-x}M'^{3+}{}_x(OH)_2]^{q+}A^{n-}{}_{q/n}.mH_2O$ where:

$M^{z+}$ and $M'^{3+}$ represent metal cations of valence z and 3 respectively, with z being generally equal to 1 or 2,
x corresponds to the molar ratio of $M'^{3+}/(M^{z+}+M'^{3+})$,
q is the net charge carried by a layer,
$A^{n-}$ stands for the interlayer anion of valence n, and
m is a positive number.

Most generally, z is equal to 2, q is thus equal to x, and the structure of a given layer is similar to a brucite sheet $(Mg(OH)_2)$ made of octahedral units in each of which a metal cation is coordinated by hydroxyl groups. It is worth noting the fact that the interlayer bonding is governed by Coulombic and H-bonding interactions. For example, some water molecules may be inside the interlayer space connected to the hydroxyl ions by hydrogen bond (FIG. 1b).

LDHs can be either naturally occurring, or synthetic. The most common anion found in the naturally occurring LDHs is carbonate. However, for what concerns synthetic LDHs, a wide variety of interlayer anions may be theoretically incorporated, ranging from small inorganic anions, such as halides, nitrate or sulfate, through organic anions and to complex biomolecules.

This has led to an ever-increasing interest for LDHs and their possible use in a broad spectrum of areas, namely catalysis, electrochemistry, biomedical or environmental sciences. Catalysis involving LDHs having catalytic species as interlayer anions benefits from the improved recuperation of immobilized catalysts in comparison with homogeneous catalysis. Another interesting property of LDHs, on which are based most potential applications, is their high anion exchange capacity. For example, their ability to scavenge inorganic contaminants and pollutants taking the shape of oxyanions, such as arsenate, chromate, nitrate, molybdate, and so on, make them good candidates for wastewater treatment [Lefevre et al. *J. Phys. Chem. C* 2015, 119, 12356-12364]. When it comes to anion extraction applications, the regeneration of the starting LDH is crucial, in order to perform several cycles of adsorption and desorption of the anion and therefore improve the efficiency of the whole process. Moreover, the extracted anions have to be recovered for disposal or reuse. The desorption and regeneration is thus the trickiest and most expensive part of an anion extraction process. Besides, more and more studies are published on the use of LDHs as controlled release drug delivery systems [Bellezza et al. *Appl. Clay Sci.* 2014, 101, 320-326].

Notwithstanding this, to the best of the applicant's knowledge, the Mg—Al carbonate hydrotalcite, of general formula $[Mg_6Al_2(OH)_{16}]CO_3.4H_2O$, remains the only commercially available LDH on a large scale. Therefore, one has to be able to synthesize a tailor-made LDH for any potential application. However, the preparation of hydrotalcite-like materials having an interstitial anion different from the carbonate ion is far from being a trivial task.

A first method consists in a direct synthesis of the LDH by co-precipitation, starting from aqueous solutions of $M^{z+}$ and $M'^{3+}$ containing the anion that is to be incorporated in the LDH. In spite of its seeming simplicity, the co-precipitation method requires careful procedures, in order to avoid carbonate contamination. Indeed, LDHs have a high affinity for carbonate anions. The fact is that on the one hand, the smaller the anion is, the easier it is to incorporate it into the LDH, and, on the other hand, the higher the negative charge is, the stronger the Coulombic interactions with the positively charged layers are. As a consequence, the direct synthesis must be carried out in anaerobic condition to prevent the competitive incorporation of the atmospheric carbon dioxide and obtain a pure material. Besides, the co-precipitation method does not allow preparing any desired LDH. For instance, it is not applicable when the metal cations or the anions involved are unstable in the alkaline solution.

Another method is based on the calcination of a carbonated LDH to remove the interlayer carbonate anions and water from the brucite-like material to create a defect hydrotalcite structure. Thanks to a structural "memory effect", the calcined LDHs are able to regenerate the layered structure when exposed to an aqueous solution containing anions. For instance, this method has been successfully used to prepare a silicate incorporated cobalt-chromium LDH [Thangaraj et al. *Catal. Commun.* 2016, 74, 85-90]. The same principle has been applied to a nitrated LDH to further intercalate paracetamol into the hydrotalcite-like host. [Kovanda et al. *J. Solid State Chem.* 2011, 184, 3329-3335]. However, the calcination protocol has several drawbacks, first of which being the high energetic cost, since the LDH must be heated above 400° C. for several hours. Another consequence of such temperatures is that this method is incompatible with some forms of LDHs. Indeed, on top of the most common powdered form, LDHs can also exist under more complex forms better suited to certain applications, such as fixed-bed column, monolithic, hybrid polymer-LDH forms, which cannot be heated to high temperatures without degrading. Besides, this method involves two separate steps, namely the calcination and the intercalation of the desired anions, that cannot be carried out in a continuous way. The resulting protocol is therefore quite complex.

An alternative method proposed in the literature to remove the carbonate ions at lower temperatures is to submit the carbonated LDH to an acidic treatment (pH~5), in order to form either the monovalent anion ($HCO_3^-$) whose affinity for the positively charged layers is not as strong as the one of the divalent anion ($CO_3^{2-}$) [Costantino et al. *Eur. J. Inorg. Chem.* 1998, 1439-1446], or ultimately carbon dioxide, whose formation is the driving force of the decarbonatation [Iyi et al. *Appl. Clay Sci.* 2011, 54, 132-137]. However, to prevent a partial dissolution of the LDH, the acidity of the solution must be carefully controlled: a better efficiency in removing carbonate ions would be obtained at low pH, but with a higher risk of LDH dissolution.

A further way to prepare a targeted LDH is the ion exchange method, which consists in exchanging anions originally present in the interlayer region of a starting LDH with the desired anions. This implies that the starting anions must be easily exchangeable, that is to say that the LDH layers must have a low affinity for them. Halogenated LDHs are for instance suitable for the ion exchange method, but it is not the case of the commercially available carbonated hydrotalcite. However, the precursor halogenated LDHs have to be prepared beforehand, which can be done using either the precipitation or the calcination method. Generally speaking, this is the major shortcoming of the anion exchange method: a starting LDH containing easily exchangeable anions has first to be synthetized before undergoing the exchange process.

There exists thus a need for a simple, efficient and cheap method to prepare tailor-made LDHs, adapted to a given envisioned application, as well as a method for extracting anions from a medium (notably for depollution or recycling of a substance) allowing the possibility of regenerating the LDH to be cost effective.

The inventor of the present invention has thus developed a new method in only two steps for exchanging interlayer anions of a LDH with other anions whose affinity for the LDH is lower than the one of the starting interlayer anions. Indeed, the inventor of the present invention has discovered that the intermediate exchange of the interlayer anions with polyoxometalate (POM) anions makes it possible to introduce, in the LDH, other anions whose affinity for the LDH is lower than the one of the starting interlayer anions, whereas the direct exchange of the starting interlayer anions of the LDH with the other anions would not have been possible.

The method according to the invention is thus useful for the preparation of tailor-made LDHs (FIG. 2), and also for the extraction of anions (FIG. 8). Contrary to the prior art, the different steps can be carried out in a continuous way and starting from a wide variety of LDHs, including a carbonated LDH such as the commercially available Mg—Al carbonated hydrotalcite. In the case of extraction, a third step will be necessary to regenerate the original LDH, which is required to ensure the efficiency of anion extraction processes that can be involved in the depollution/treatment of waste water.

SUMMARY OF THE INVENTION

The subject-matter of the present invention is a method for exchanging interlayer anions of a layered double hydroxide (LDH) with other anions whose affinity for the LDH is lower than the one of the starting interlayer anions, which comprises the successive steps of:
(1) exchanging the starting interlayer anions of a layered double hydroxide with polyoxometalate (POM) anions in order to obtain a layered double hydroxide with polyoxometalate anions as interlayer anions, and
(2) exchanging the polyoxometalate (POM) anions of the layered double hydroxide obtained in step (1) with other anions whose affinity for the LDH is lower than the one of the starting interlayer anions in order to obtain a layered double hydroxide with other anions as interlayer anions.

DETAILED DESCRIPTION AND ADDITIONAL EMBODIMENTS

Figure 1A:
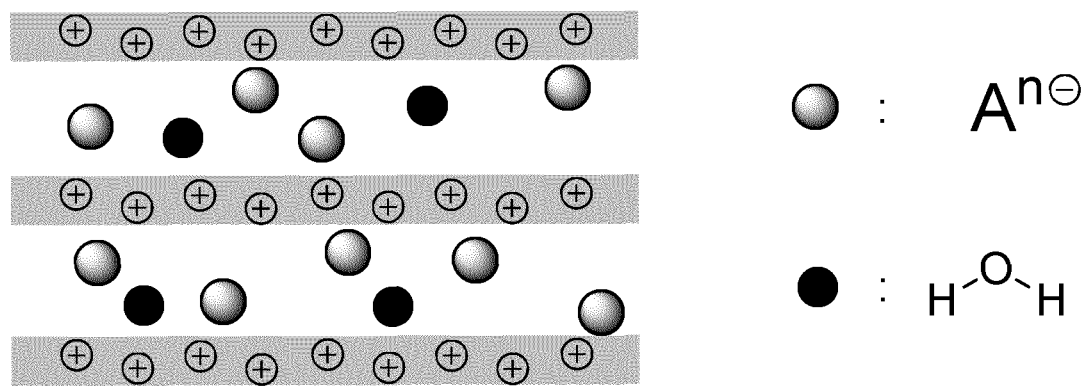
FIG. 1a provides a schematic representation of the structure of a LDH, that consists of positively charged stacked layers with charge-balancing anions $A^{n-}$ and water molecules located in the interlayer regions.
Figure 1B:
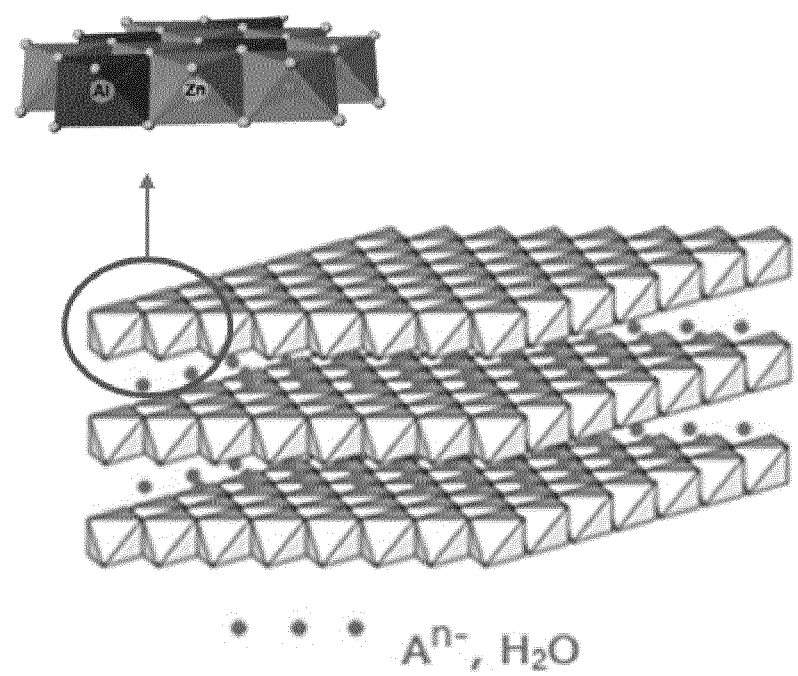
FIG. 1b provides a schematic representation of the structure of a Zn—Al LDH. Each layer of this hydrotalcite-like material is made of octahedral units that share edges to form infinite sheets. Each octahedral unit consist in a metal cation, either $Zn^{2+}$ or $Al^{3+}$, coordinated by 6 hydroxyl groups
Figure 2:
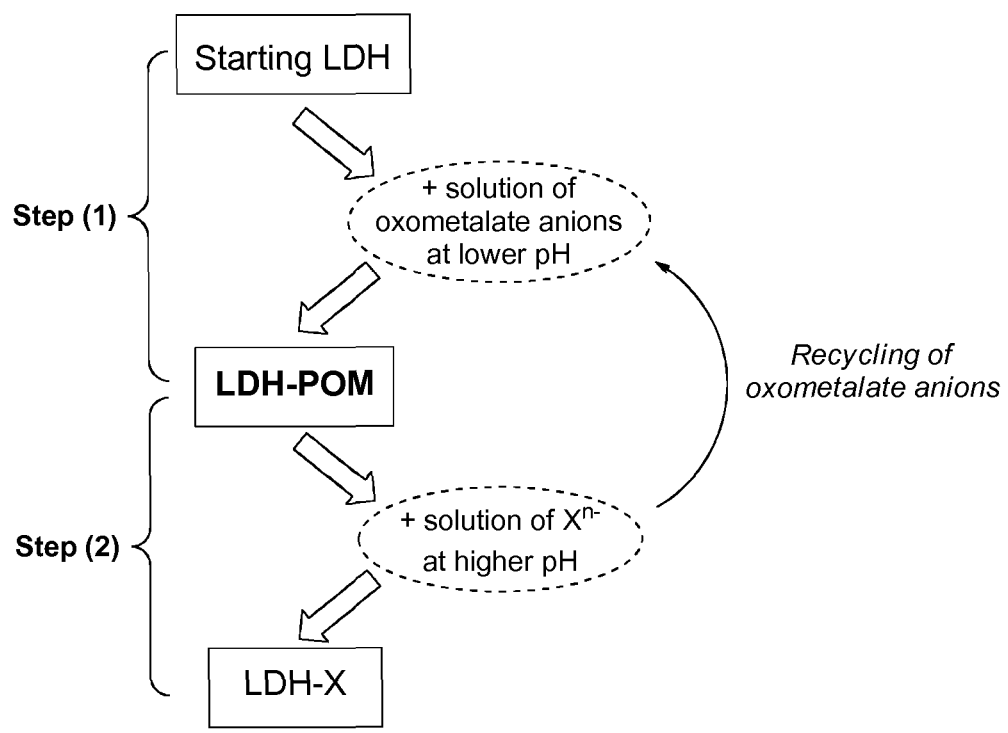
FIG. 2 shows the principle of the method for exchanging interlayer anions of a layered double hydroxide according to the invention, applied to a starting LDH in order to synthetize a LDH-X with $X^{n-}$ anions as interlayer anions, via the preparation of a LDH-POM mediator. Both exchange steps are carried out in a solution containing the anions that are to be intercalated in the considered step, whose pH is such that the exchange is favored.

The present invention concerns a method for exchanging interlayer anions of a layered double hydroxide (LDH) with other anions whose affinity for the LDH is lower than the one of the starting interlayer anions, which comprises the successive steps of:
(1) exchanging the starting interlayer anions of a layered double hydroxide with polyoxometalate anions in order to obtain a layered double hydroxide with polyoxometalate anions as interlayer anions, and
(2) exchanging the polyoxometalate anions of the layered double hydroxide obtained in step (1) with other anions whose affinity for the LDH is lower than the one of the starting interlayer anions in order to obtain a layered double hydroxide with other anions as interlayer anions.

In the context of the present invention, "layered double hydroxide" refers to inorganic materials that consist of positively charged stacked layers with charge-balancing anions located in the interlayer regions. They can be described with the general formula $[M^{II}_{1-x}M^{III}_{x}(OH)_2]^{x+} A^{n-}_{x/n}.mH_2O$ where:
- $M^{II}$ and $M^{III}$ represent metal cations of valence z and 3 respectively, with z being generally equal to 1 or 2,
- x corresponds to the molar ratio of $M^{III}/(M^{II}+M^{III})$ and also the net charge carried by a layer,
- $A^{n-}$ stands for the interlayer anion of valence n, and
- m is a positive number.

$M^{II}$ can be selected from the group consisting of $Ca^{2+}$, $Mg^{2+}$, $Mn^{2+}$, $Fe^{2+}$, $Co^{2+}$, $Ni^{2+}$, $Cu^{2+}$, $Zn^{2+}$ and $2Li^+$.

$M^{III}$ can be selected from the group consisting of $Al^{3+}$, $Mn^{3+}$, $Fe^{3+}$, $Co^{3+}$, $Cr^{3+}$ and $Ni^{3+}$.

x can be comprised between 0 and 1, preferably between 0.1 and 0.8 and more preferably between 0.2 and 0.4.

Preferably, z is equal to 2, and the LDH can be described with the general formula $[M^{2+}_{1-x}M'^{3+}_{x}(OH)_2]A^{n-}_{x/n}.mH_2O$ where:
- $M^{2+}$ and $M'^{3+}$ represent metal cations of valence 2 and 3 respectively,
- x corresponds to the molar ratio of $M'^{3+}/(M^{2+}+M'^{3+})$ and also the net charge carried by a layer,
- $A^{n-}$ stands for the interlayer anion of valence n, and
- m is a positive number.

$M^{2+}$ can be selected from the group consisting of $Ca^{2+}$, $Mg^{2+}$, $Mn^{2+}$, $Fe^{2+}$, $Co^{2+}$, $Ni^{2+}$, $Cu^{2+}$ and $Zn^{2+}$.

$M^{3+}$ can be selected from the group consisting of $Al^{3+}$, $Mn^{3+}$, $Fe^{3+}$, $Co^{3+}$, $Cr^{3+}$ and $Ni^{3+}$.

x can be comprised between 0 and 1, preferably between 0.1 and 0.8 and more preferably between 0.2 and 0.4.

The LDH layers general formula is thus $[M^{II}_{1-x}M'^{III}_{x}(OH)_2]^{x+}$, wherein:
- $M^{II}$ and $M'^{III}$ represent metal cations of valence z and 3 respectively, with z being generally equal to 1 or 2, preferably 2, and
- x corresponds to the molar ratio of $M'^{III}/(M^{II}+M'^{III})$ and also the net charge carried by a layer.

$M^{II}$ can be selected from the group consisting of $Ca^{2+}$, $Mg^{2+}$, $Mn^{2+}$, $Fe^{2+}$, $Co^{2+}$, $Ni^{2+}$, $Cu^{2+}$, $Zn^{2+}$ and $2Li^+$.

$M'^{III}$ can be selected from the group consisting of $Al^{3+}$, $Mn^{3+}$, $Fe^{3+}$, $Co^{3+}$, $Cr^{3+}$ and $Ni^{3+}$.

x can be comprised between 0 and 1, preferably between 0.1 and 0.8 and more preferably between 0.2 and 0.4.

In particular, $M^{II}$ can be $Mg^{2+}$ and $M'^{III}$ can be $Al^{3+}$.

The interlayer anion $A^{n-}$ according to the invention may be the starting anion, a polyoxometalate anion, another anion, or a second anion.

The "starting interlayer anions" according to the invention are the anions that are originally located in the interlayer regions of the starting LDH.

In the method according to the present invention, any starting anions can be used. In particular, the starting anions may be monovalent or multivalent, organic or inorganic. In a preferred embodiment, the starting anions are carbonates.

In a most preferred embodiment, the starting layered double hydroxide is hydrotalcite.

In the context of the present invention, "polyoxometalate anions", abbreviated POM, refers to polyatomic anions, that contain three or more transition metal oxyanions linked together by shared oxygen atoms, notably 5 or more, in particular 7 or more.

The transition metal is usually a group 6 metal such as molybdenum (Mo) or tungsten (W), or a group 5 metal like vanadium (V), niobium (Nb) or tantalum (Ta), in their higher stable oxidation states. It can also be a mixture of these atoms. Preferably, it is Mo, W, or V.

A POM can be described with the general formula $[M_mO_y]^{p-}$, where y and p are positive numbers, and m is greater than or equal to 3, notably greater than or equal to 5, in particular greater than or equal to 7.

A POM can also contain a main group metal, and if so is referred to as a hetero-polyoxometalate, that can be described with the general formula $[X_xM_mO_y]^{p-}$ where x, y and p are positive numbers, m is greater than x and greater than or equal to 3, notably greater than or equal to 5, in particular greater than or equal to 7. X can be phosphorus (P) or silicon (Si).

In both formulas above, M can be a group 6 metal such as molybdenum (Mo) or tungsten (W), or a group 5 metal like vanadium (V), niobium (Nb) or tantalum (Ta), in their higher stable oxidation states, or a mixture of these atoms. Preferably, M corresponds to one type of atom, such as Mo, W, or V.

POMs are characterized by very high negative charge (p in the formulas above), usually superior or equal to 2, preferably superior or equal to 3, more preferably superior or equal to 5, and present thus an important affinity for the positively charged layers of a LDH.

In a preferred embodiment, the polyoxometalate involved in the method according to the invention is selected from the group consisting of polymolybdate, polytungstate, polyvanadate and mixtures thereof.

Figure 4:
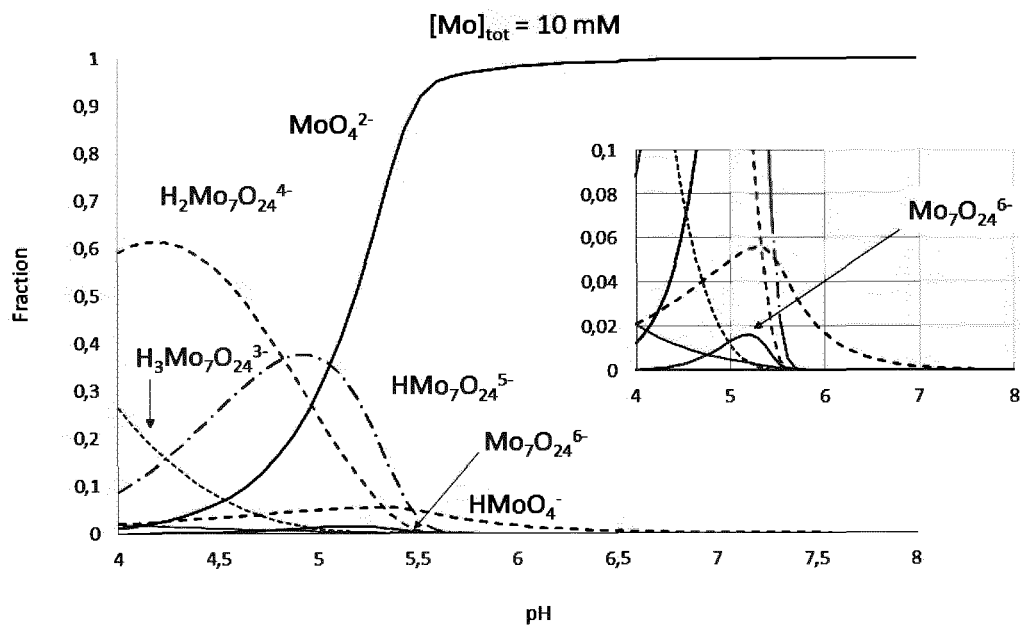
FIG. 4 illustrates the Mo(VI) speciation in function of pH using MEDUSA software and the corresponding database.
Figure 9:
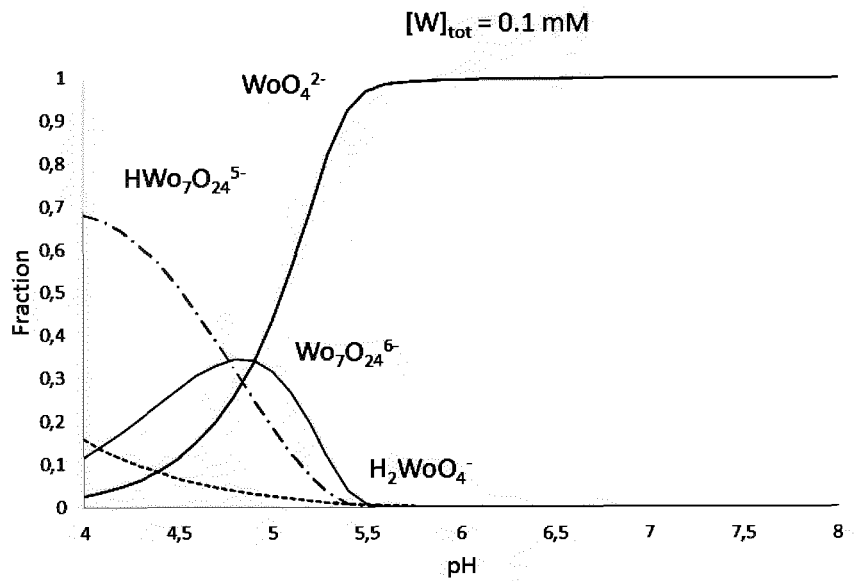
FIG. 9 illustrates the W(VI) speciation in function of pH using MEDUSA software and thermodynamic data from literature [Cruywagen, *Adv. Inorg. Chem.* 2000, 49, 127-182; Cruywagen et al. *J. Chem. Soc., Dalton Trans.* 1987, No. 7, 1701-1705].

POMs mostly form at acidic pH, and tend to depolymerize to give the corresponding oxometalate anions, whose charge is lower than the one of the initial POM (in terms of absolute value), and is preferably inferior or equal to 2, when the pH increases (FIGS. 4 and 9).

In the context of the present invention, "oxometalate anions", refers to oxyanions containing at least a transition metal atom, including POM.

The "other anions" according to the invention are the anions that are exchanged with the polyoxometalate anions during step (2). They are also different from the starting interlayer anions.

Their affinity for the LDH layers is inferior to the one of the starting anions. This means that the direct exchange of the starting interlayer anions of the LDH with the other anions is not possible. The affinity of an anion depends in the first place on its charge (the more negative the species to exchange, the higher its affinity towards LDHs) then on its geometry which can allow a stabilization by H-binding [Prasanna and Vishnu Kamath, Ind. Eng. Chem. Res. 48, 6315-6320 (2009)].

The other anions may be monovalent or multivalent, inorganic anions ($NO_3^-$, halides, etc.) or organic anions (drugs as Ibuprofen or Naproxen, agrochemicals as Picloram or Glyphosate, etc.).

By "exchange" is meant in the present invention that at the microscopic scale, a given anion (starting, polyoxometalate or other anion) is replaced by another anion (polyoxometalate, other anion or second anion). At the macroscopic scale, the exchange may or may not be total, but at least some of the anions have been exchanged.

The duration of the anion exchange according to the invention can range from 1 hour to 3 days, notably from 8 to 30 hours.

In a preferred embodiment, the exchanging step (1) is carried out in a solution containing oxometalate anions, such as an aqueous solution, whose pH is such that polyoxometalate anions are formed and the affinity of the LDH layers for the polyoxometalate anions is higher than its affinity for the starting anions.

In particular, the solution containing the oxometalate anions has a pH between 4 and 6, notably about 5.

The oxometalate anions concentration in the solution can range from 0.1 mM to 1 M, notably from 1 mM to 0.1 M, more particularly from 1 mM to 10 mM.

In another preferred embodiment the exchanging step (2) is carried out in a solution containing the other anions, such as an aqueous solution, whose pH is such that the polyoxometalate anions depolymerize to give oxometalate anions other than polyoxometalate anions and the affinity of the LDH layers for the said oxometalate anions is lower than its affinity for the other anions.

In particular, the pH of the solution containing the other anions is higher than 6, notably higher than 6.5. The pH of the solution containing the other anions can in particular have a pH between 6 and 13, such as between 6 and 9. More particularly, the pH of the solution containing the other anions has a pH between 6.5 and 13, such as between 6.5 and 9.

Preferably, the charge of the oxometalate anions is lower than the one of the initial POM (in terms of absolute value), and is preferably inferior or equal to 2.

The other anions concentration in the solution can range from 0.1 mM to 1 M, notably from 1 mM to 0.1 M, and more preferably from 1 mM to 10 mM.

The method according to the present invention allows an easy access to LDHs with various types of interlayer anions.

Depending on the envisioned further applications of the LDH resulting from the method according to the invention, the other anions may be catalysts, drugs, biomolecules, anti-corrosive agents, etc.

The LDH resulting from the method according to the invention can be in various forms, such as powder, fixed-bed column, monolithic or hybrid polymer-LDH forms, or also be part of a composite material.

The method according to the present invention can be used also for the extraction of the other anions. In this case, steps (1) and (2) are advantageously followed by an additional step (3) of:

(3) exchanging the other anions of the layered double hydroxide obtained in step (2) with second anions, in order to obtain a layered double hydroxide with second anions as interlayer anions.

The "second anions" refers to the anions that are exchanged in place of the other anions during step (3), when present.

The second anions may be monovalent or multivalent, organic or inorganic anions.

Preferably the second anions are identical to the starting anions, and the method according to the invention can be used for extracting the other anions from a solution, and allows the regeneration of the starting LDH, that can hence be reused for at least another cycle.

Most preferably, the starting and second anions are carbonates.

Therefore, the present invention also relates to the use of a method for extracting other anions contained in a liquid medium. Step (2) of the method is performed in a solution containing the other anions, whose pH is adjusted so that polyoxometalate anions depolymerize to give oxometalate anions other than polyoxometalate anions and the affinity of the LDH layers for the said oxometalate anions is lower than its affinity for the other anions.

The other anions are afterwards exchanged in step (3) of the method with second anions.

Figure 8:
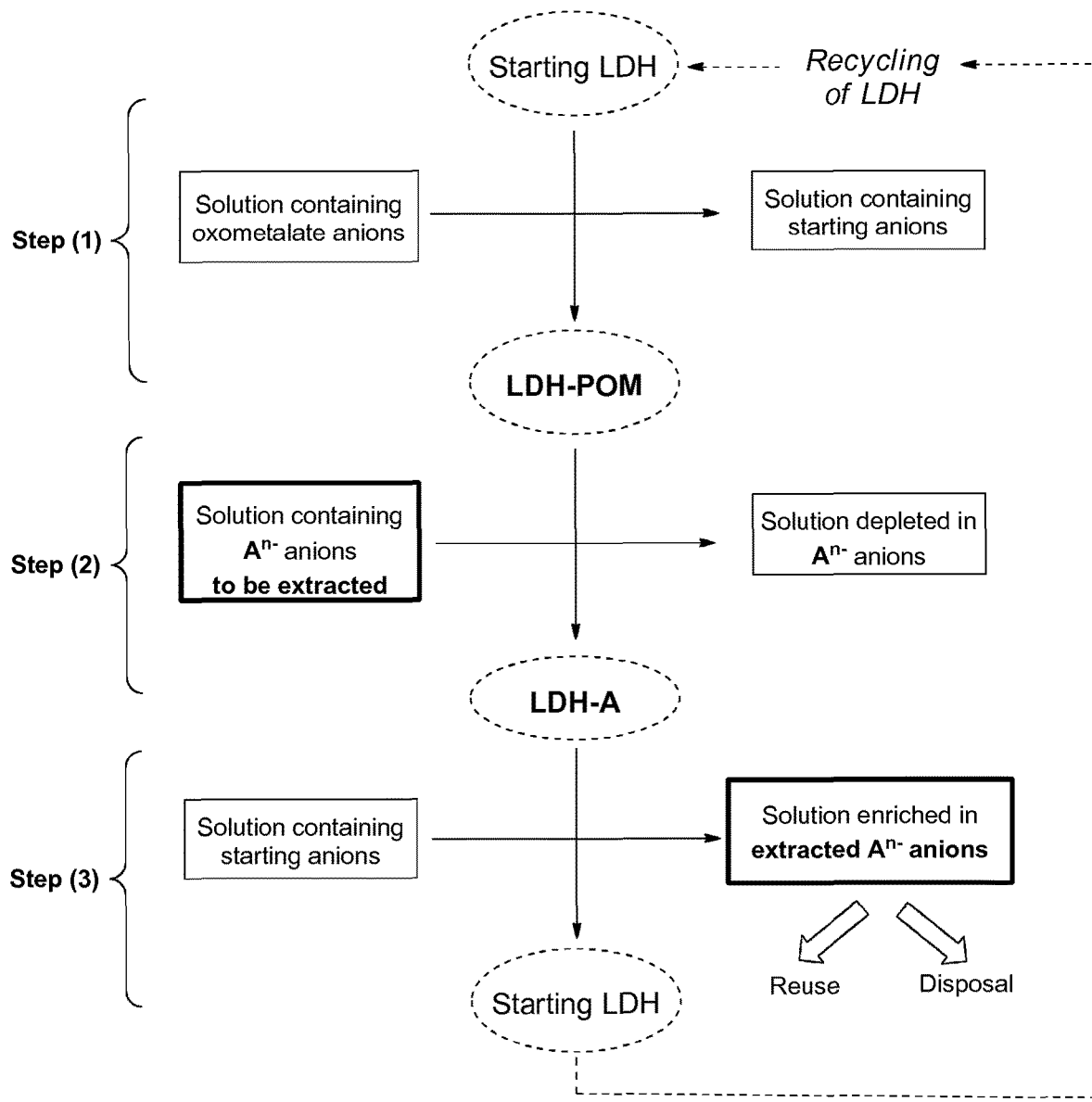
FIG. 8 shows the principle of the use of the method according to the invention for extracting anions.

Preferably, the second anions are identical to the starting anions, and more preferably are carbonates, so that the LDH obtained at the end of step (3) can be recycled and used for performing at least another cycle of steps (1), (2) and (3) (FIG. 8).

The examples that follow illustrate the invention without limiting its scope in any way.

EXAMPLES

1. Preparation of LDHs Exchanged with POMs (Step (1))

A commercial carbonated hydrotalcite ($Mg_6Al_2(CO_3)$ $(OH)_{16} \cdot 4H_2O$; Sigma-Aldrich, ref. 652288) has been used. The experimental procedure consisted in stirring a 3.3 g/L suspension of LDH in a $10^{-2}$ M molybdate sodium aqueous solution (200 mL). A pH value of 5 was imposed by addition of small volumes (approximately 50 µL) of $HNO_3$ using an automatic titrator (Metrohm, software Tiamo). This addition was performed in 1 hour, then the suspension was stirred at a stabilized pH during 19 hours.

Figure 3A:
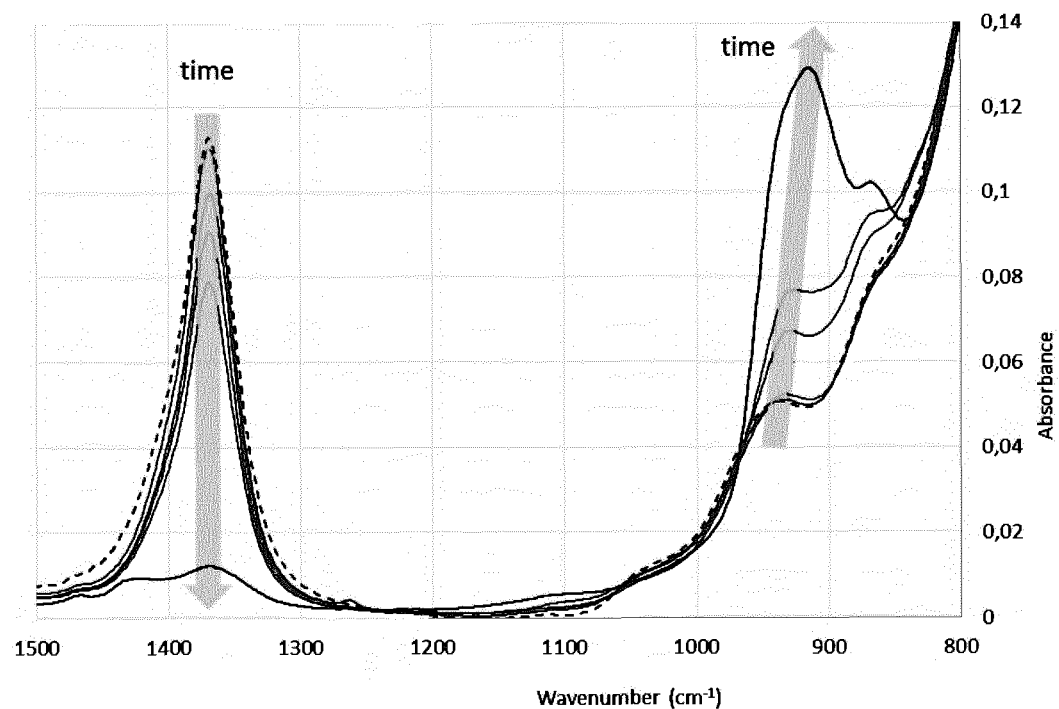
FIG. 3a shows the evolution over time of ATR-IR (Attenuated Total Reflection—Infra Red) spectra of a LDH undergoing step (1) of the method according to the invention for exchanging interlayer anions. More precisely, the starting anions are carbonates, and the POM anions are polymolybdate anions. Carbonate and polymolybdate ions band are located at 1370 $cm^{-1}$ and 920 $cm^{-1}$, respectively. The LDH resulting from step (1) is referred below as LDH-Mo7.
Figure 3B:
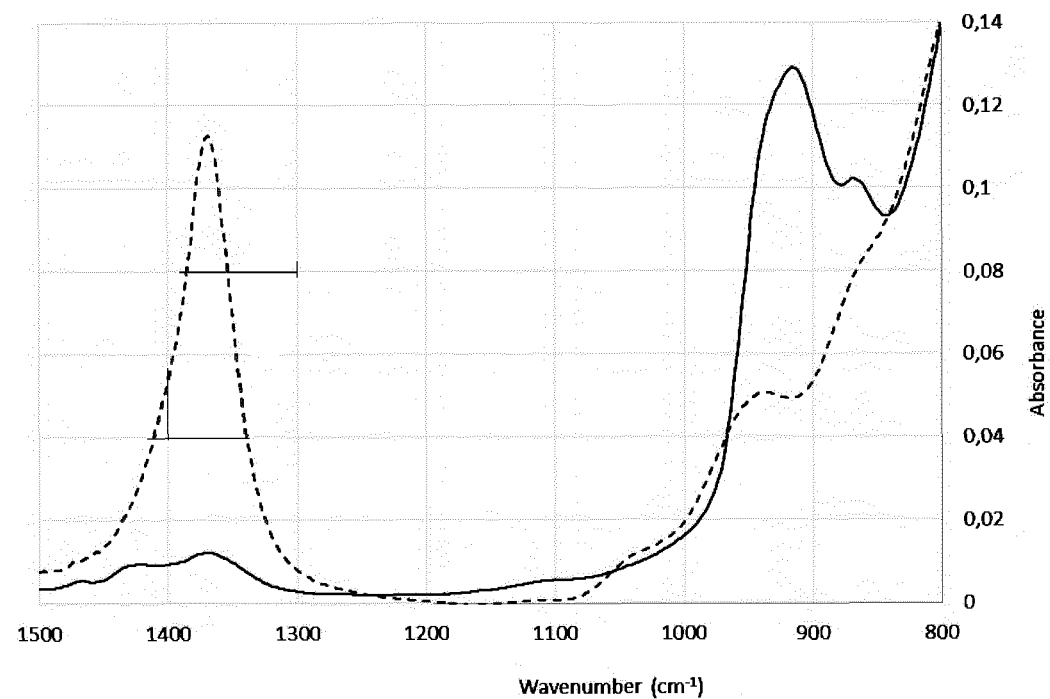
FIG. 3b displays only the initial (dashed line) and the final spectra (continuous black line), that is to say the spectra of the LDH before the exchange and at the end of the exchange respectively.

The exchange has been followed by recording ATR-IR spectra of suspension aliquots after different durations. The procedure consisted in filtrating 5 ml of the suspension, followed by rinsing with 3 ml of deionized water, then resuspension in 1 ml of water. Then, 1 µL of this suspension was dried on the Attenuated Total Reflection element to get the spectrum: the decrease of the carbonate ion band was found to be correlated to the growth of the polymolybdate band (FIGS. 3a and 3b). In these conditions (pH, concentration), molybdate forms a highly-charged heptamer, namely $Mo_7O_{24}^{6-}$ (in different protonation states, as it can be seen in FIG. 4). This fully-deprotonated species, present at low concentration, has a high affinity towards LDH, much higher than the one of carbonate ions. After the exchange step, the solid was filtered, rinsed by $HNO_3$ pH 4 to keep molybdate ion as a heptamer, then dried in a silica gel filled dessicator.

Figure 5:
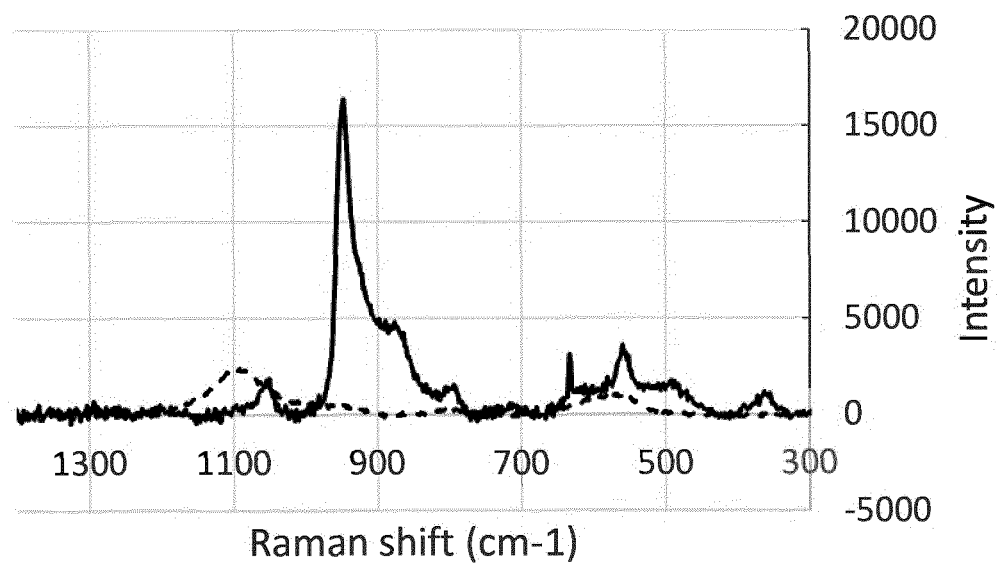
FIG. 5 corresponds to the Raman spectra of the commercial LDH undergoing step (1) of the method according to the invention (dashed line) and the resulting LDH-Mo7 (full line). Carbonate and heptamolybdate ions band are located at 1100 $cm^{-1}$ and 950 $cm^{-1}$, respectively.

The solid obtained after this step has been characterized by micro-Raman spectroscopy (FIG. 5), and the results confirmed that a LDH with $Mo_7O_{24}^{6-}$ interlayer anions has been obtained, in agreement with literature [Ciocan et al. Catal. Today 2012, 198 (1), 239-245]. The solid is referred as "LDH-Mo7" in the following.

2. Preparation of LDHs Exchanged with Other Anions (Step (2))

2.1. With Methyl Orange

The exchange of methyl orange has been chosen to demonstrate the POM mediator way to intercalate low-affinity anion. This ion is characterized by only one negative charge (sulfonate). It is easily titrated by spectrophotometry due to its orange color.

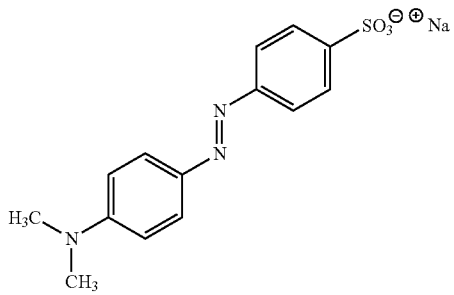

Structure of methyl orange (sodium sulfonate)

Figure 6:
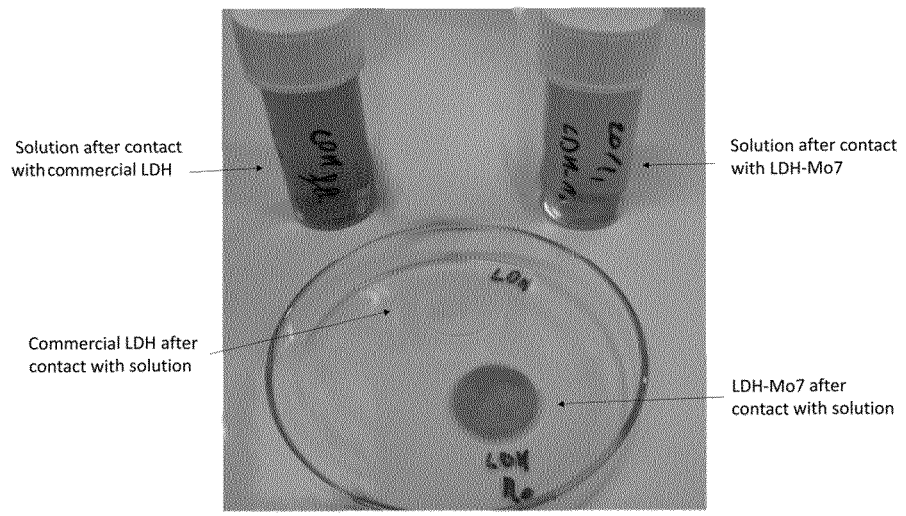
FIG. 6 shows the proof of the exchange of polymolybdate by methyl orange according to step (2) of the claimed method in a LDH-Mo7. Indeed, the solution that initially contains methyl orange has lost its orange coloration after being in contact with the LDH-Mo7, as one can see on the right-hand side of the picture, while the LDH has turned orange. On the left-hand side of the picture, one can see that the direct exchange of carbonates with methyl orange does not take place in the commercial hydrotalcite.

The exchange has been performed by mixing 4.6 mg of LDH-Mo7 in 30 ml of 9 mM methyl orange solution under a nitrogen flux to avoid $CO_2$ dissolution. pH has been increased from 5.7 to 6.8 using sodium hydroxide. The total duration of the experiment was 24 h. A blank has been performed using the same protocol with commercial (carbonated) LDH. After the exchange, the solids have been filtered and rinsed with 2 ml of deionized water. In FIG. 6, a picture of solutions and solids after reaction are shown.

Figure 7:
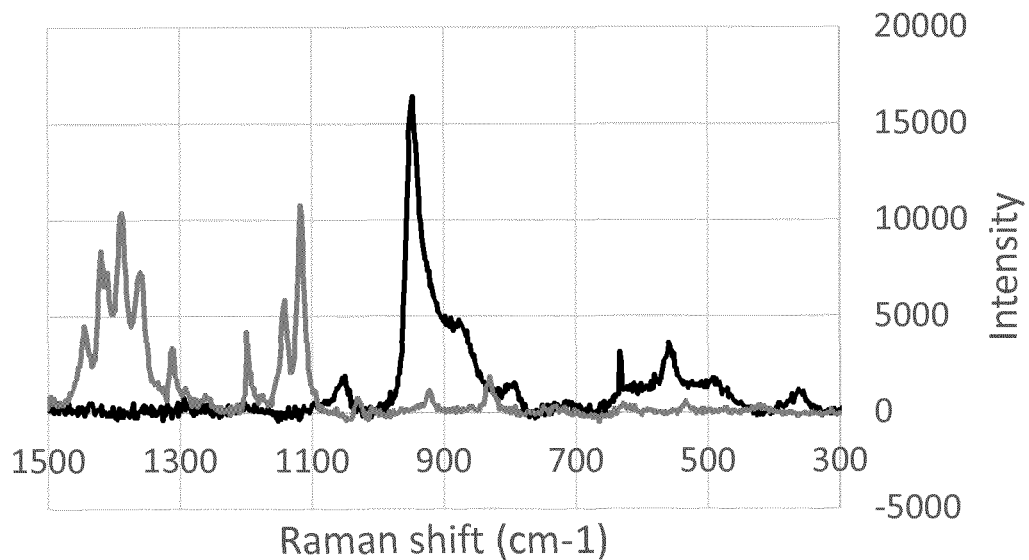
FIG. 7 corresponds to the Raman spectra of the LDH-Mo7 undergoing step (2) of the method according to the invention (black line) and the resulting LDH having methyl orange as interlayer anions (grey line). Heptamolybdate and methyl orange ions band are located at 950 $cm^{-1}$ and above 1000 $cm^{-1}$, respectively.

The commercial LDH remained white, while LDH-Mo7 became orange. Solutions have been analyzed by spectrophotometry: no decrease of methyl orange concentration has been observed for the solution of the experiment with commercial LDH, while a decrease by 57% has been measured for the solution of the experiment with LDH-Mo7. Analyses by micro-Raman (FIG. 7) have shown the presence of methyl orange band in the solid, along with the disappearance of polymolybdate bands.

These analyses demonstrate that the LDH with methyl orange anions has been prepared with the process according to the invention, which is not possible by a direct exchange step with a carbonated LDH, due to the low affinity of the methyl orange anion for the layers in comparison to carbonate.

Uptake of methyl orange was achieved because the pH has been chosen beyond the stability domain of heptamolybdate (FIG. 4). Around pH 6.7, the depolymerization of heptamolybdate takes place, and methyl orange can enter the LDH structure.

2.2. With Ibuprofen or Picloram

Two organic molecules have been chosen to demonstrate the application fields of POM mediator way to intercalate low-affinity anion in LDH, i.e. ibuprofen and picloram.

The incorporation of drug anions as ibuprofen in LDH presents a wide range of pharmaceutical applications. In this case, the release mechanisms of drugs consist in its dissolution at low pH values (pH around 1.2 in the gastric fluid). Ibuprofen is characterized by a low hydrophobicity at high pH and a negative charge (carboxylate). The solid obtained after this exchange is referred as "LDH-Ibu" in the following.

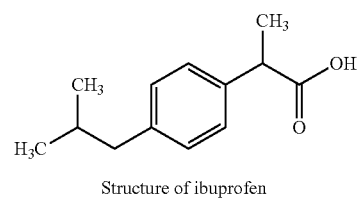

Structure of ibuprofen

The incorporation of herbicid as picloram in LDH presents a wide range of phytosanitary applications. In this case, the release mechanism of herbicide is by anions exchange, at moderately low pH values (pH between 4 at 5.5 corresponding to rainwater pH), in presence of competitive anions such as carbonate. Picloram is characterized by a negative charge (carboxylate) at neutral to basic pH. The solid obtained after this exchange is referred as "LDH-Pic" in the following.

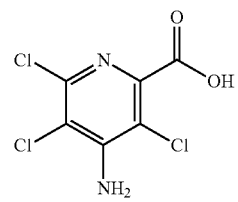

Structure of picloram

In both cases, the preparation of the molecule-laden LDHs has been performed by two consecutive exchange steps of ibuprofen or picloram on LDH-Mo7. The first sorption has been performed by mixing 6.6 mg of LDH-Mo7 in 20 ml of 0.13 M ibuprofen solution, or by mixing 6.6 mg of LDH-Mo7 in 20 ml of 50 mM picloram solution. Sorptions were performed under a nitrogen flux to avoid $CO_2$ dissolution. pH has been increased from 5.7 to 12 using sodium hydroxide. The total duration of the experiments was 24 h. After the first exchange, the solid has been centrifuged, sonicated and washed with 2 ml of deionized water twice. Then, the second sorption has been performed with the same experimental conditions as previously, for the two organic molecules respectively: the solid from the first sorption has been mixed in 20 ml of 0.13 M ibuprofen solution, or in 20 ml of 0.13 M picloram solution, under a nitrogen flux at pH 12 during 24 h. The resulting solid has been rinsed in the same way as previously described. Blanks have been performed using the same protocol with commercial (carbonated) LDH.

Figure 10:
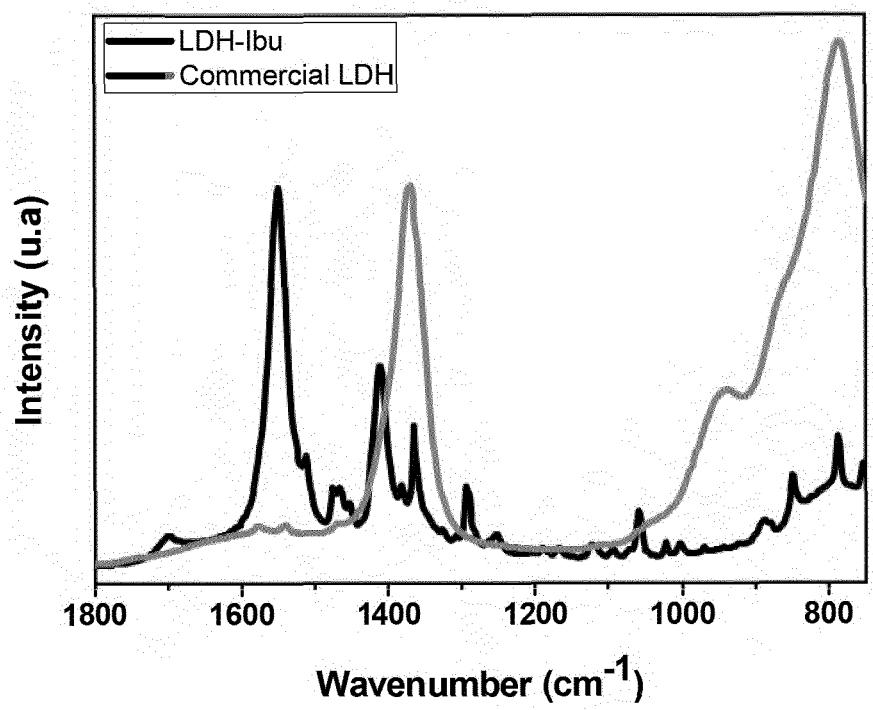
FIG. 10 corresponds to the normalized IR-ATR spectra of the LDH-Ibu sample resulting from step (2) and having Ibuprofen as interlayer anions (dark line), and of the resulting LDH after the same sorption protocol applied on a commercial carbonated LDH (grey line). According to the literature [Mara L et al. *Journal of Colloid and Interface Science.* 351 (2010) 134-139], the bands at 1545 $cm^{-1}$ and 1360 cm$^{-1}$ (dark line) correspond to the asymmetric and symmetric modes of the carboxylate group of the ibuprofen respectively.
Figure 11:
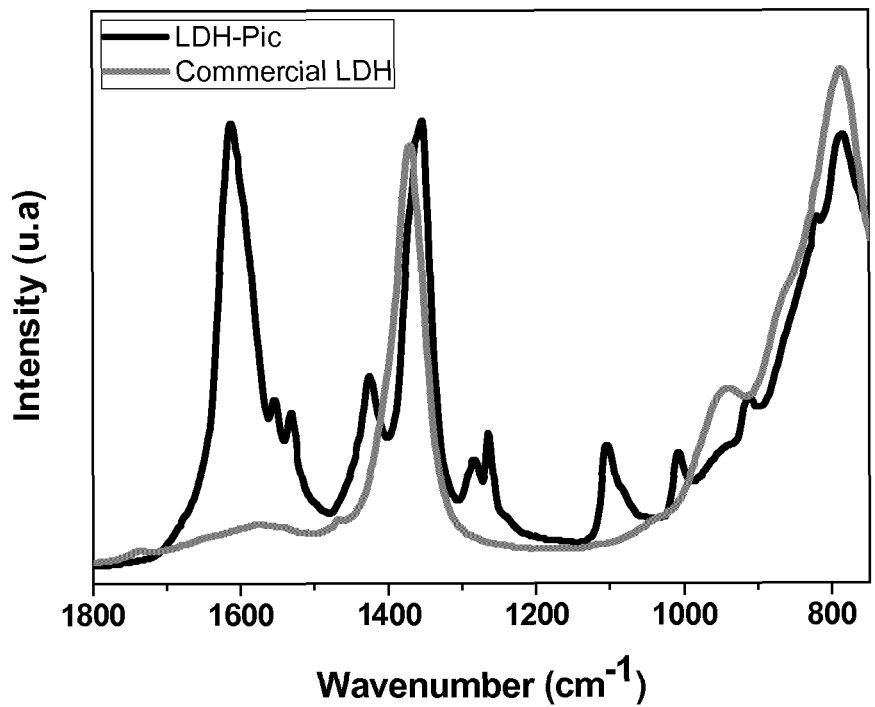
FIG. 11 corresponds to the normalized IR-ATR spectra of the LDH-Pic sample resulting from step (2) and having Picloram as interlayer anions (black line), and of the resulting LDH after the same sorption protocol applied on a commercial carbonated LDH (grey line). According to the literature [Luis H et al. *Quim. Nova*, Vol. 38, No. 1, 71-76, 2015], the band at 1600 cm$^{-1}$ and the bands in the range of 1300-1550 cm$^{-1}$ (dark line) correspond to the carbonyl stretching vibration and C=C pyridine ring vibrations respectively of Picloram molecule.

ICP-OES analysis and IR-ATR (Infrared—Attenuated total reflection) spectra have been performed on the three solids: LDH-Mo7, LDH-Ibu, LDH-Pic. Analyses by IR- ATR have shown the presence of Ibuprofen (FIG. 10) or Picloram (FIG. 11) bands in the solid (black lines), along with the disappearance of polymolybdate bands. No appearance of Ibuprofen or Picloram bands are observable in the experiment with carbonated LDH. The resulting remaining amounts of molybdate ions, after Picloram or Ibuprofen sorption, is shown in the table below.

|  | Sample | | |
| --- | --- | --- | --- |
|  | LDH-Mo7 | LDH-Ibu | LDH-Pic |
| Mass percentage of Molybdate in sample | 49.1 | 0.2 | 1.0 |
| Mass percentage of organic molecule | 0 | 39 | 44 |

The exchange of molybdate is almost total, 99.6% and 98% of molybdate are desorbed during Ibuprofen and Picloram exchange steps respectively. The theoretical amounts of organic molecules have been calculated from residual heptamolybdate amount and positive charge of the LDH, assuming carboxylated molecules (monoanions). The resulting solid contents a high amount of molecules, as expected.

These results demonstrate that the LDH with Picloram or Ibuprofen anions has been prepared with the process according to the invention, which is not possible by a direct exchange step with a carbonated LDH, due to the low affinity of theses organic anions for the layers in comparison to carbonate. These examples illustrate the large application fields of POM mediator way to intercalate anions of interest.

3. Release of Picloram and Ibuprofen Molecules from LDH-Pic and LDH-Ibu

Figure 12:
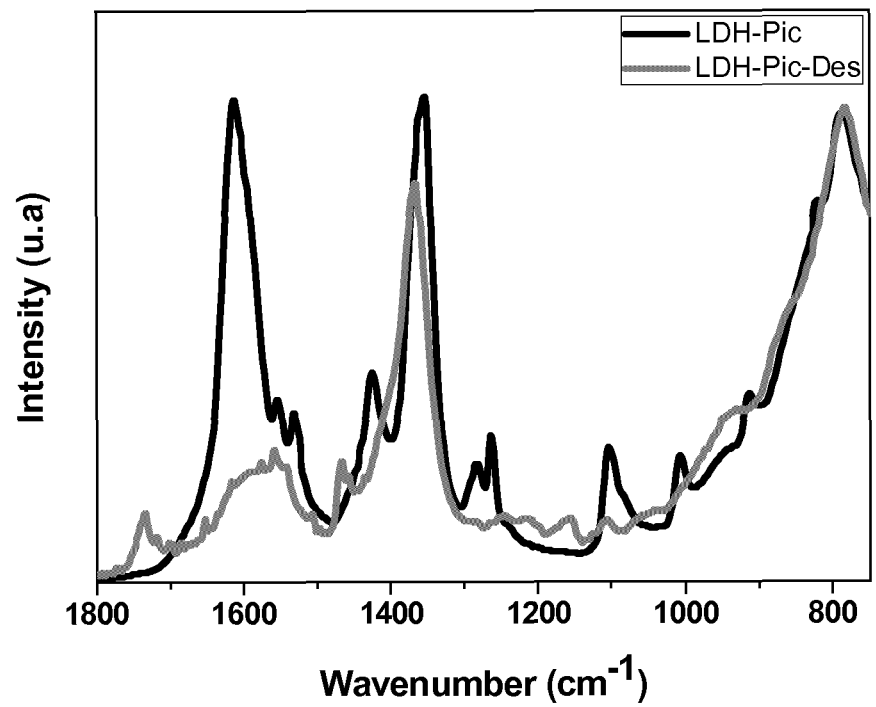
FIG. 12 corresponds to the normalized IR-ATR spectra of the LDH-Pic sample resulting from step (2) and having Picloram as interlayer anions (black line), and of the LDH-Pic-Des sample after exchange of Picloram (grey line) in the LDH-Pic in rainwater conditions. The bands corresponding to the Picloram vibration are not present (grey line), that indicates the release of Picloram under rainwater conditions.

The release of Ibuprofen would occur by dissolution of the LDH-Ibu at acidic pH (pH around 1.2 corresponding to the gastric fluid). The release step of Picloram in soils would be a leaching by the rainwater by anionic exchange with carbonate ions. Experimentally, the exchange has been performed by mixing 6.6 mg of LDH-Pic, in 20 ml of 151 µM carbonate solution at pH 5. The total duration of the experiments was 24 h. Then, the solid has been centrifuged, sonicated and washed with 2 ml of deionized water twice time. FIG. 12 shows the comparative band of the same LDH-Pic sample before (black line) and after (grey line) the release of picloram in rainwater conditions. Analyzes by IR-ATR have shown the disappearance of Picloram bands in rainwater conditions, corresponding to a total release of Picloram molecules, replaced by carbonate ions.

The invention claimed is:

1. A method for exchanging starting interlayer anions of a layered double hydroxide (LDH) with other anions whose affinity for the LDH is lower than for the starting interlayer anions of the LDH, which comprises the successive steps of:
   (1) exchanging the starting interlayer anions of the layered double hydroxide with polyoxometalate anions in order to obtain a layered double hydroxide with polyoxometalate anions as interlayer anions, and
   (2) exchanging the polyoxometalate anions of the layered double hydroxide obtained in step (1) with other anions whose affinity for the LDH is lower than the one of the starting interlayer anions in order to obtain a layered double hydroxide with other anions as interlayer anions.

2. The method according to claim 1, wherein the exchanging step (1) is carried out in a solution containing oxometalate anions, whose pH is such that polyoxometalate anions are formed and the affinity of the LDH layers for the polyoxometalate anions is higher than its affinity for the starting interlayer anions.

3. The method according to claim 1, wherein the exchanging step (2) is carried out in a solution containing the other anions, whose pH is such that the polyoxometalate anions depolymerize to give oxometalate anions other than polyoxometalate anions and the affinity of the LDH layers for the said oxometalate anions is lower than its affinity for the other anions.

4. The method according to claim 1, wherein the LDH layers general formula is $[M^{II}_{1-x} M^{III}_{x}(OH)_2]^{x+}$, wherein:
   $M^{II}$ is selected from the group consisting of $Ca^{2+}$, $Mg^{2+}$, $Fe^{2+}$, $Co^{2+}$, $Ni^{2+}$, $Cu^{2+}$ $Zn^{2+}$ and $2^{Li}+$,
   $+M^{III}$ is selected from the group consisting of $Al^{3+}$, $Mn^{3+}$ $Fe^{3+}$, $Co^{3+}$, $Cr^{3+}$ and $Ni^{3+}$, and
   x is equal to the molar ratio of $M^{III}/(M^{II}+M^{III})$ and is comprised between 0 and 1.

5. The method according to claim 4, wherein $M^{II}$ is $Mg^{2+}$ and $M^{III}$ is $Al^{3+}$.

6. The method according to claim 4, wherein x is comprised between 0.1 and 0.8.

7. The method according to claim 4, wherein x is comprised between 0.2 and 0.4.

8. The method according to claim 1, wherein the polyoxometalate is selected from the group consisting of polymolybdate, polytungstate, polyvanadate and mixtures thereof.

9. The method according to claim 1, wherein the starting interlayer anions are carbonates.

10. The method according to claim 9, wherein the layered double hydroxide is hydrotalcite.

11. The method according to claim 1, wherein the other anions are monovalent or multivalent, organic or inorganic anions.

12. The method according to claim 1, wherein steps (1) and (2) are followed by an additional step (3) of:
   exchanging the other anions of the layered double hydroxide obtained in step (2) with second anions, in order to obtain a layered double hydroxide with second anions as interlayer anions.

13. The method according to claim 12, wherein steps (1), (2) and (3) are performed at least a second time.

14. The method according to claim 12, wherein the second anions are identical to the starting interlayer anions.

15. A method for extracting anions contained in a solution, which comprises the steps of:
   (1) exchanging starting interlayer anions of a layered double hydroxide with polyoxometalate anions in order to obtain a layered double hydroxide (LDH) with polyoxometalate anions as interlayer anions,
   wherein the affinity for the LDH of the anions to be extracted is lower than for the starting interlayer anions,
   (2) placing the layered double hydroxide obtained in step (1) in the solution containing the anions to be extracted, and
   (3) extracting the anions contained in said solution by exchanging the polyoxometalate anions of the layered double hydroxide with the anions to be extracted.

16. The method according to claim 15, wherein:
   the exchanging step (1) is carried out in a solution containing oxometalate anions, whose pH is such that polyoxometalate anions are formed and the affinity of the LDH layers for the polyoxometalate anions is higher than its affinity for the starting anions, and the pH of the solution in extracting step (3) is such that the polyoxometalate anions depolymerize to give oxometalate anions other than polyoxometalate anions and the affinity of the LDH layers for the said oxometalate anions is lower than its affinity for the anions to be extracted.

17. The method according to claim 15, wherein the LDH layers general formula is $[M^{II}_{i-x} M'^{III}_{x}(OH)_2]^{x+}$, wherein:
   $M^{II}$ is selected from the group consisting of $Ca^{2+}$, $Mg^{2+}$, $Mn^{2+}$, $Fe^{2+}$, $Co^{2+}$, $Ni^{2+}$, $Cu^{2+}$, $Zn^{2+}$ and 2 $Li^+$,
   $M^{III}$ is selected from the group consisting of $Al^{3+}$, $Mn^{3+}$, $Fe^{3+}$, $Co^{3+}$, $Cr^{3+}$ and $Ni^{3+}$, and
   x is equal to the molar ratio of $M'''^{III}/(M^{II}+M'''^{III})$ and is comprised between 0 and 1.

18. The method according to claim 15, wherein the polyoxometalate is selected from the group consisting of polymolybdate, polytungstate, polyvanadate and mixtures thereof.

19. The method according to claim 15, wherein the starting interlayer anions are carbonates.

20. The method according to claim 19, wherein the layered double hydroxide is hydrotalcite.

\* \* \* \* \*